Dec. 9, 1952 R. A. STEWART ET AL 2,620,977

CARD FEED CONTROLLING MECHANISM

Filed Dec. 29, 1950 5 Sheets-Sheet 1

INVENTORS
RICHARD A. STEWART
ARNOLD E. BARBER
BY Harry T. Berriman
AGENT

INVENTORS
RICHARD A. STEWART
ARNOLD E. BARBER
BY Harry T. Berriman
AGENT

CARD FEED CONTROLLING MECHANISM

Filed Dec. 29, 1950 5 Sheets-Sheet 3

INVENTORS
RICHARD A. STEWART
ARNOLD E. BARBER
BY Harry T. Berriman
AGENT

CARD FEED CONTROLLING MECHANISM

Filed Dec. 29, 1950 5 Sheets-Sheet 4

INVENTORS
RICHARD A. STEWART
ARNOLD E. BARBER
By Harry T. Berriman
AGENT

INVENTORS
RICHARD A. STEWART
ARNOLD E. BARBER
By Harry T. Berriman
AGENT

Patented Dec. 9, 1952

2,620,977

UNITED STATES PATENT OFFICE 2,620,977

CARD FEED CONTROLLING MECHANISM

Richard Alan Stewart and Arnold E. Barber, Poughkeepsie, N. Y., assignors to International Business Machines Corporation, New York, N. Y., a corporation of New York Application December 29, 1950, Serial No. 203,372

9 Claims. (Cl. 235—61.6)

This invention relates to a mechanism for controlling the feeding of cards to a card handling machine, and more particularly to a mechanism which is operable in response to the sensing of predetermined designations on cards for delaying the feeding of the cards to a card handling machine for selectable time intervals.

In conventional punched card accounting machine practice, there is usually provided a card hopper from which cards are fed, one by one from the bottom of a card stack into a card handling machine. It is customary in certain types of operations for these cards to be arranged in groups of so called detail cards, each group of detail cards following a so called master card. The master card contains some particular common group information which is read into the card handling machine and stored for determining operations on each of the detail cards of the following group as they pass through the card handling machine. When the master card of the next group feeds into the card handling machine, the new group information on that card reads into the card handling machine and clears out the group information of the previous master card.

It is necessary in such machines that the feeding of each master card after the first be delayed until all of the operations on the last one or two detail cards in the preceding group have been performed. The delayed feeding of the master cards has been accomplished in the past by hand sorting into the card decks, between the last detail card of each group and the master card of the following group, one or more blank record cards, as required. These blank cards permitted the operation by the card handling machine to be completed on all the cards of the previous group of detail cards before the next master card entered the card handling machine, but this procedure was not completely satisfactory since the blank cards had to be removed later when they were not needed in connection with other operations to be performed on the cards. This resulted in a constant and time consuming hand sorting of blank cards into and out of the card decks.

This invention is directed to a mechanism which operates to detect the presence of a master card at the bottom of a card stack in a hopper and to prevent the feeding of the master card from the hopper to a card handling machine until all operations have been performed on the detail cards of the previous group fed to the card handling machine. The mechanism may comprise a device which acts upon each card as it reaches the bottom of the stack to sense a designation, such as a cut corner. A card having a cut corner may be a detail card, while one having a corner uncut may be a master card. Upon the detection of a card having its corner uncut, a mechanism is operated to make the card feeding means ineffective to advance the next card to the machine for a predetermined period. A preferred embodiment of the invention may comprise a mechanism which lifts the trailing edges of the cards so that the bottom card is clear of an oscillating picker for one or two card feed cycles, as desired. If the feed delay of master cards is not required at all times, the mechanism can be made selectively operative by a simple control means.

An object of this invention is to provide an improved mechanism for controlling the feeding of cards to a card handling machine in response to the sensing of card designations.

Another object is to provide an improved mechanism which is operable in response to the sensing of designations on cards for effecting a feeding of the cards with or without delay to a card handling machine.

Still another object is to provide a mechanism adapted to sense a designation on a card and to delay the feeding of the card to a machine when no designation is sensed.

Yet another object is to provide an improved mechanism having a device which is adapted to sense a cut corner on a card at the bottom of a card stack in a feed hopper and to lift the card out of the path of a card picker when no cut corner is sensed.

Still another object is to provide a mechanism which is operable to test each card of a stack for a cut corner when the card reaches the bottom of the stack in a hopper and to lift the cards so that the one tested is removed from the path of a card picker when no cut corner is sensed, said mechanism being adjustable for holding the cards in a raised position during any one of predetermined time intervals.

Other objects of the invention will be pointed out in the following description and claims and illustrated in the accompanying drawings, which disclose, by way of example, the principle of the invention and the best mode, which has been contemplated, of applying that principle.

Figure 2:
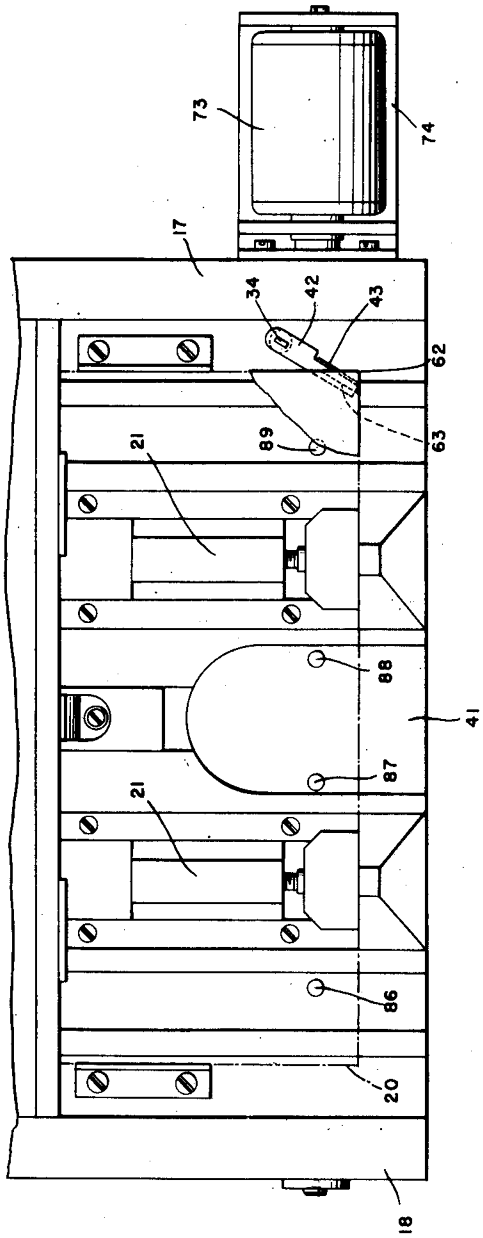
Fig. 2 is a plan view of the hopper and feed control mechanism in Fig. 1, and shows the relationship between a card and a card sensing member when the latter is in its home position.
Figure 2B:
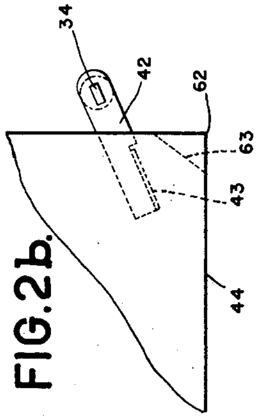
Figure 2A:
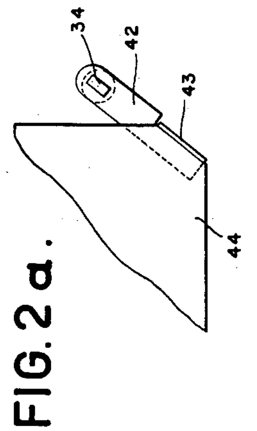

Fig. 2*a* is a detail plan view showing the sensing member in position to detect the cut corner of a card.

Fig. 2*b* is a detail plan view showing the sensing member in a position to which it moves when no cut corner is sensed.

Figure 1:
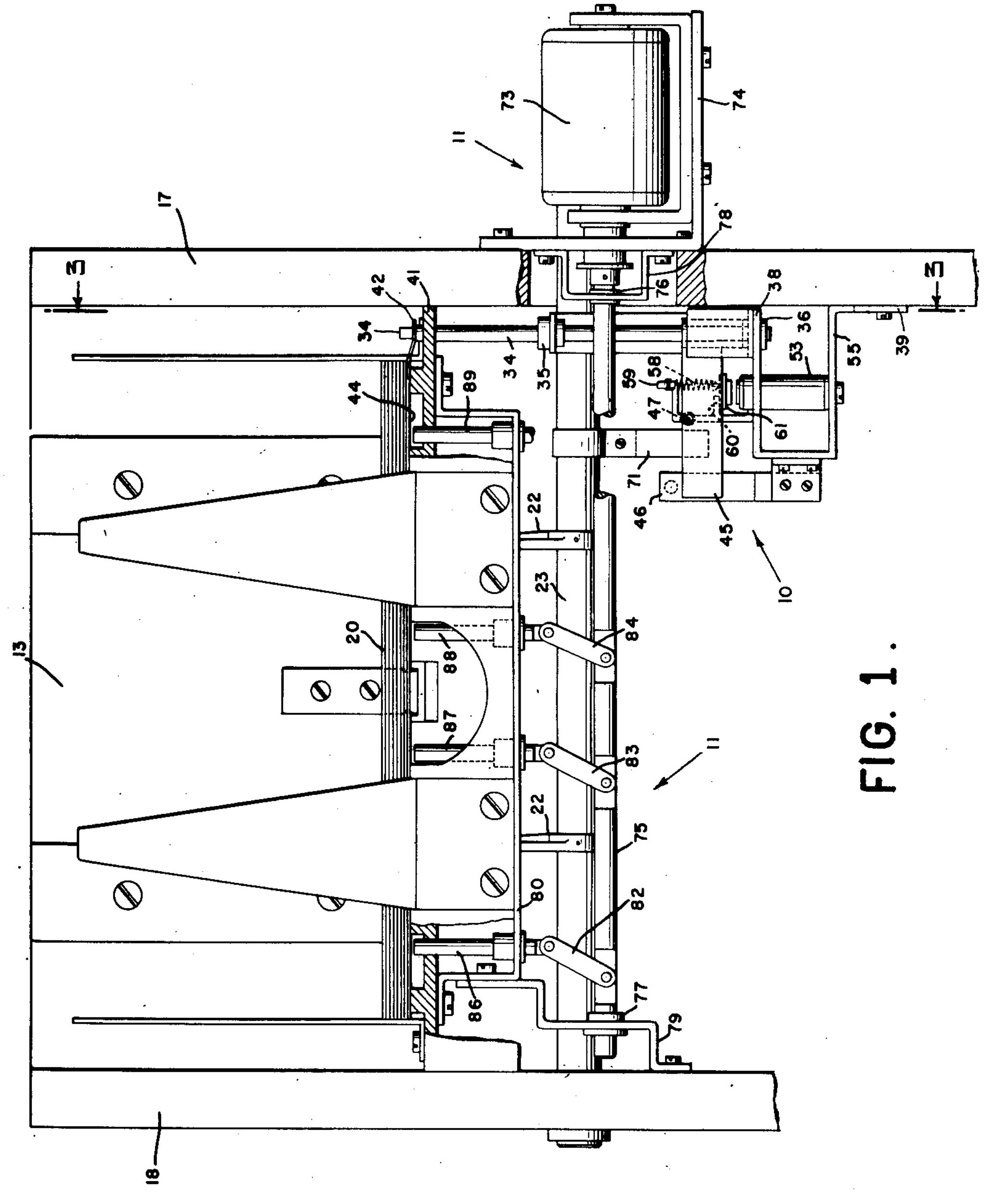
Fig. 1 is a front elevational view of a card hopper with the improved feed control mechanism associated therewith, and having portions of the hopper and mechanism broken away to facilitate illustration.
Figure 3:
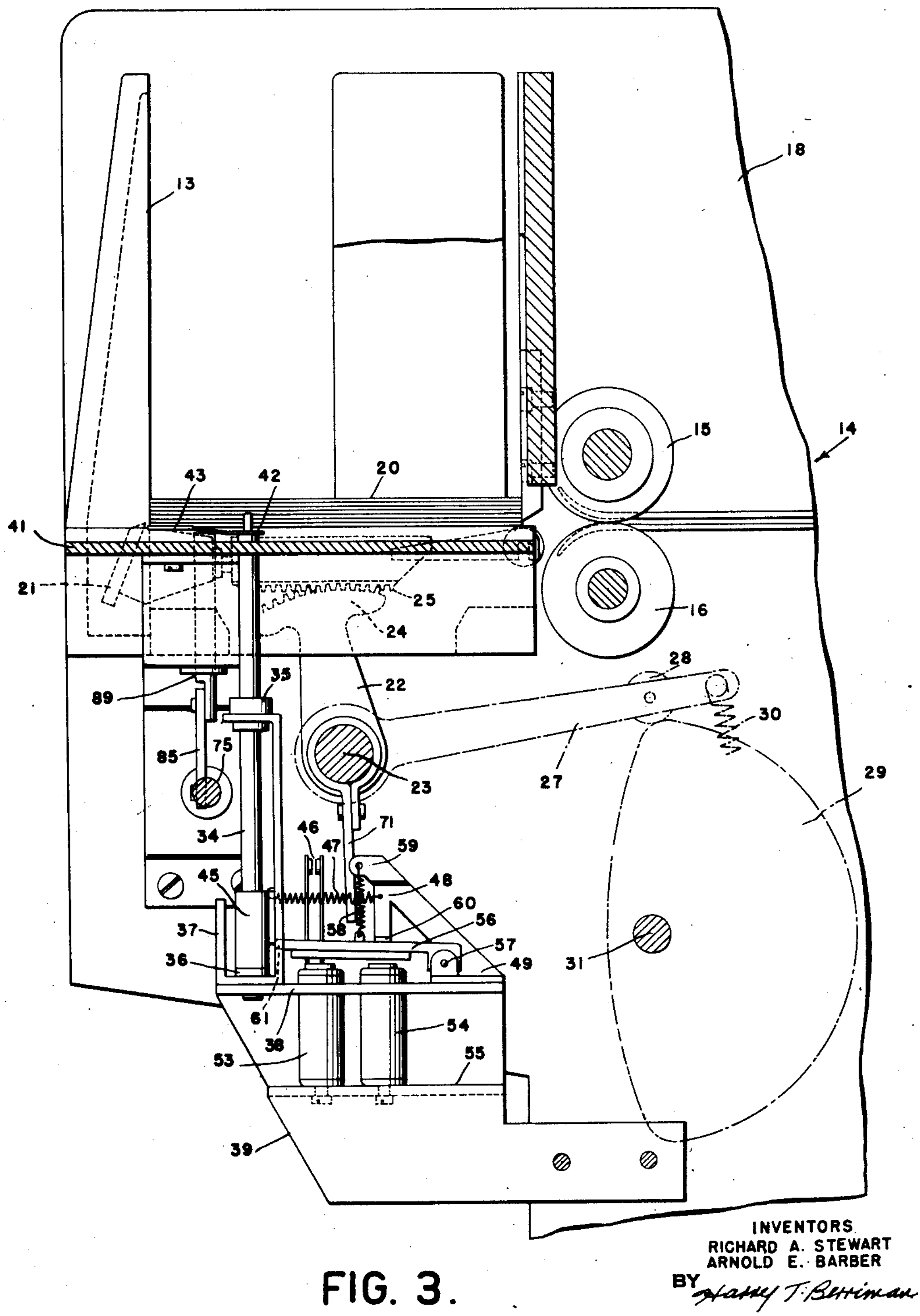

Fig. 3 is vertical sectional view taken on the plane of the line 3—3 of Fig. 1, with portions broken away to facilitate illustration.

Figure 4:
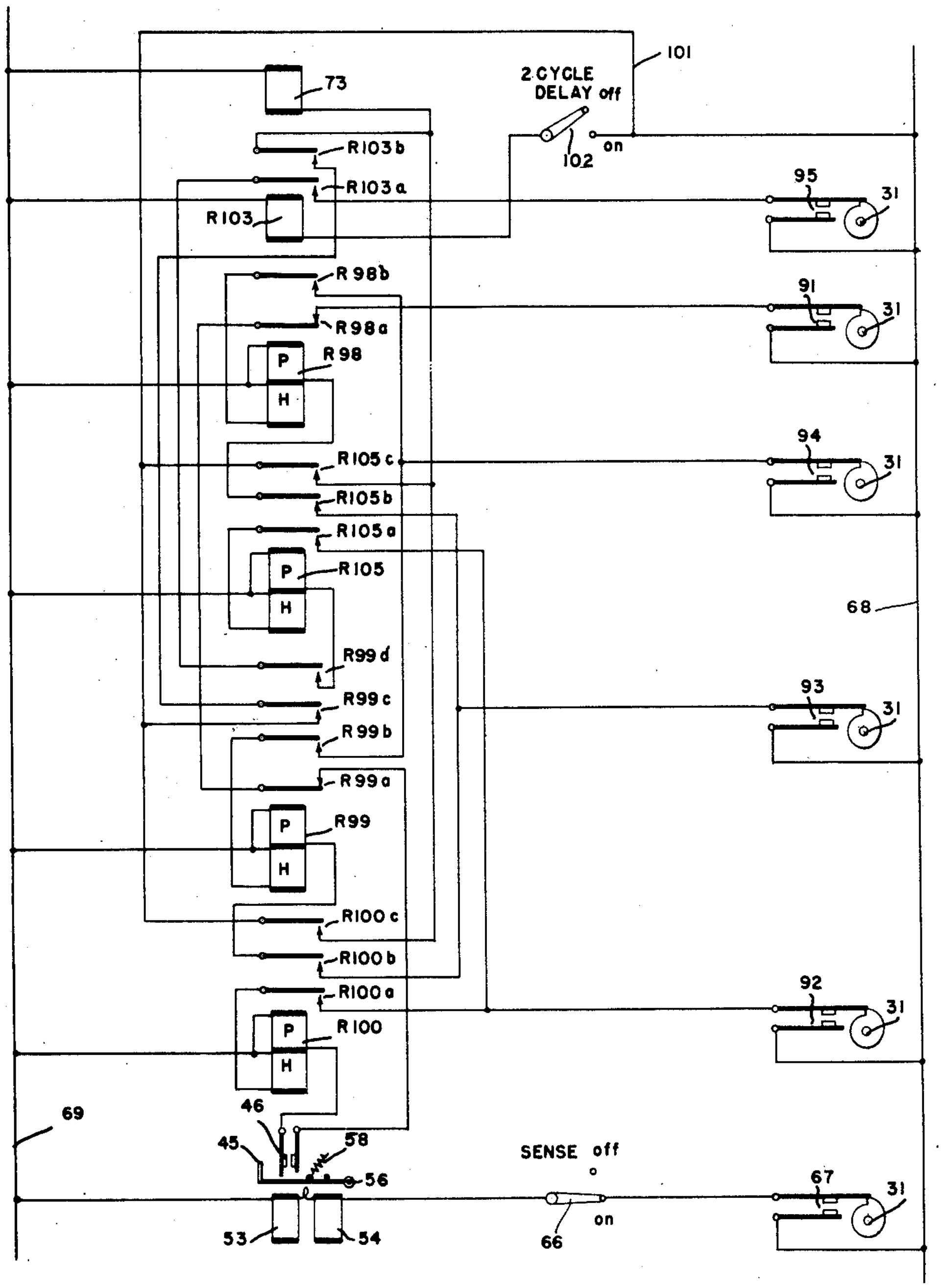

Fig. 4 is a circuit diagram.

Figure 5:
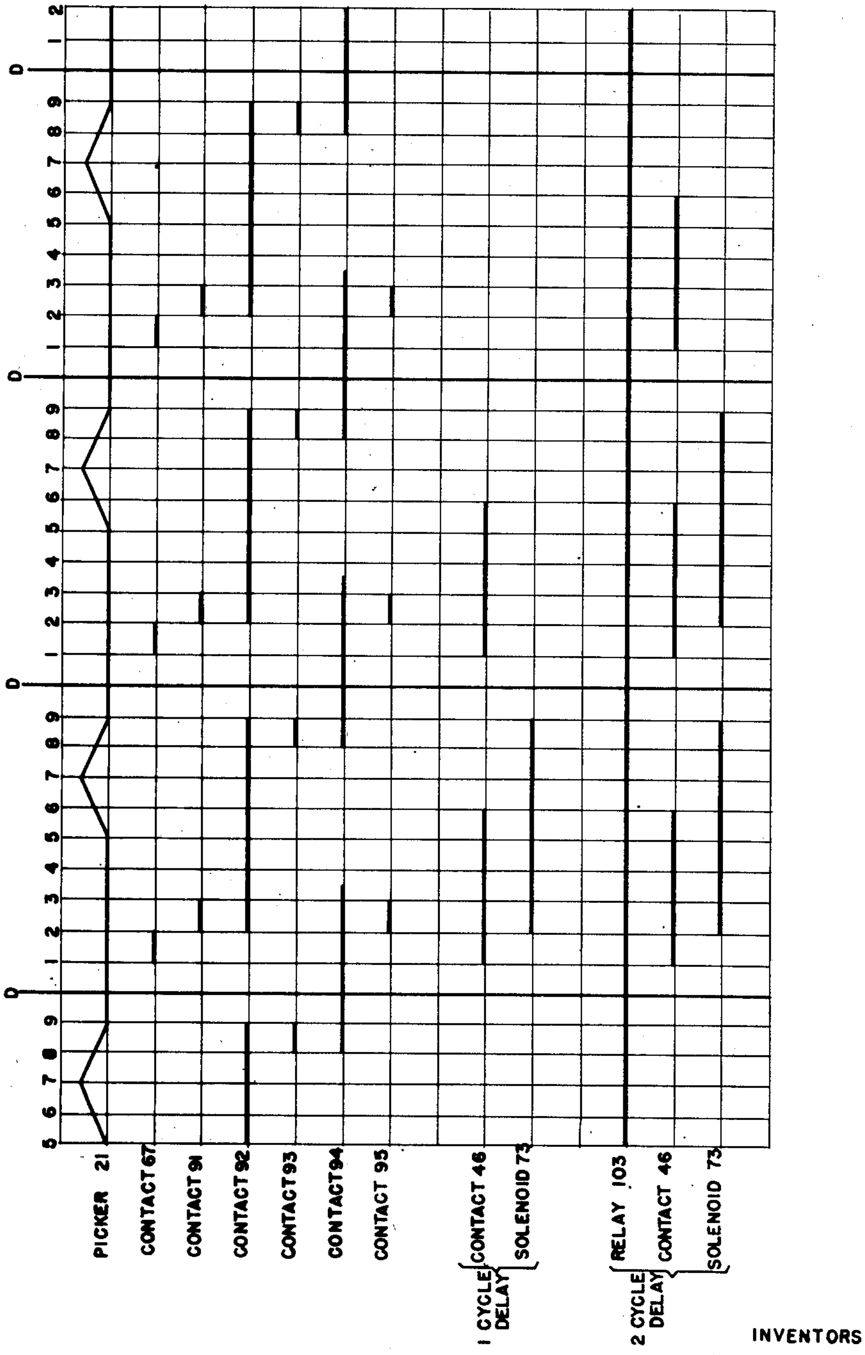

Fig. 5 is an electrical and mechanical timing chart.

Referring to Figs. 1 and 3 it will be noted that there is shown a card sensing mechanism, generally designated 10, and a card delay mechanism, generally designated 11, associated with a card hopper 13 of a cyclically operated card handling machine, generally designated 14. Only the card hopper, the first two card feed rollers 15 and 16, and a portion of the side frames 17 and 18 of the card handling machine are shown. The hopper 13 is adapted to receive a stack of record cards 20, as shown in Figs. 1 and 3, and a conventional picker 21 is oscillated each cycle to advance the bottom card of the stack from the hopper into the feed rollers 15 and 16 of the card handling machine.

For oscillating the picker 21, there is provided a member 22 secured to a shaft 23 journalled in the side frames 17 and 18 of the card handling machine. The member 22 has a toothed portion 24 meshing mating teeth cut in the underside of the picker 21 so that a rocking of the shaft 23 and member 22 clockwise in Fig. 3 results in a movement of the picker to the right to feed the bottom card in the hopper into the feed rolls 15 and 16 of the card handling machine. Conversely, as the shaft 23 rocks counter-clockwise, the picker restores to the left to the position shown. For rocking the shaft 23, there is provided an arm 27 secured to the shaft 23 and carrying a roller 28 which is held in engagement with a cam 29 by a spring 30 connected between the arm and a stud (not shown) secured to the side frame 17.

The representative card handling machine shown in Figs. 1 and 3 operates on a 10 point cycle as shown in Fig. 5, and the cam 29, which is secured to a continuously rotating shaft 31 journalled in the side frames 17 and 18 of the card handling machine, is shaped to rock the shaft 23 clockwise from index points 5 to 7 of each cycle to effect card feed movement of the picker and rock the shaft counterclockwise from index points 7 to 9 of each cycle to effect restoration of the picker. There are also mounted on the continuously rotating shaft 31 of the card handling machine six cams each of which effects the timed closing of a related contact the purpose of which will be evident in a later description of the circuits of the invention.

*Sensing mechanism*

The sensing mechanism 10 comprises a shaft 34 rotatably supported in a vertical position by bearings 35 and 36 carried by a bracket 37. The latter is attached to a shelf 38 of a frame 39 which, in turn, is secured to the side frame 17 of the card handling machine. The upper end of the shaft extends through an opening in the base 41 of the card hopper at a point slightly forward and to the right of the trailing edge of the card stack in the hopper. The top end of the shaft 34 is rectangular in shape and engages a mating rectangular hole in sensing member 42 to lock the member for rotation with the shaft. It will be noted that the sensing member has an upwardly extending lip 43 which projects into the plane of the bottom card 44 of the stack in the hopper.

Secured to the bottom of the shaft 34 is an arm 45 which is engageable with a pair of spring contacts 46, the latter being secured to the side of the frame 39 as most clearly shown in Fig. 1. A spring 47 connected between the arm 45 and an extension 48 of a bracket 49 secured to the shelf 38, tends to rotate the shaft 34 in a clockwise direction in Fig. 2 so that the arm 45 engages and closes the contacts 46. A pair of magnets 53 and 54 attached to a shelf 55 of the frame 39, extend upward through an opening in the shelf 38 of the frame to position the cores of the magnets beneath an armature 56 which is pivotally mounted on a shaft 57 carried by the bracket 49. An armature return spring 58 connected between the armature 56 and an extension 59 of the bracket 49 normally maintains the armature against an extension 60 of the bracket, as shown in Fig. 3. In this normal position, the end 61 of the armature abuts the arm 45 to latch the arm and the shaft 34 against clockwise rotation by the spring 47. This is a so called home position which the mechanism assumes shortly before the beginning of each cycle in a manner to be later explained. In this home position of the mechanism shown in Fig. 3, the associated sensing member 42 occupies the position shown in Fig. 2. It is noted that with the sensing member in home position, its lip 43 is positioned inside the corner point 62 of the bottom card in the stack if that card does not contain a cut corner, or the lip is positioned outside the cut corner edge 63 of the bottom card if that card contains a cut corner.

The sensing mechanism described above is operable shortly after the beginning of each cycle to determine the presence or absence of a cut corner on the bottom card of the stack in the hopper. This sensing operation, which is completed prior to the card feed movement of the picker later in the cycle, is accomplished in the following manner. With a delay "on-off" switch 66 (Fig. 4) in the "on" position, the closing of a cam contact 67 by a cam on the constantly rotating shaft 31 from index point 1 to index point 2 of each cycle, as indicated in Fig. 5, completes a circuit to momentarily impulse the magnets 53 and 54. The circuit extends from a power line 68 through the normally open cam contact 67, closed from index point 1 to 2 of each cycle, through the delay "on-off" switch 66 in the "on" position, through the magnets 53 and 54 and thence to a power line 69. Upon the impulsing of the magnets 53 and 54, the associated armature 56 rocks counter-clockwise on its pivot shaft 57 from its position shown in Fig. 3 to unlatch or release the arm 45. The spring 47 then swings the arm over the top of the armature and rotates the associated shaft 34 and sensing member 42 clockwise in Fig. 2. If the bottom card of the stack in the hopper contains a cut corner, the lip 43 of the sensing member encounters the cut corner edge of the card as the blade swings clockwise. As a result, the swinging of the sensing member, the associated shaft 34 and arm 45 is arrested before the end of the arm is able to engage and close the contacts 46. Fig. 2*a* shows the position of the sensing member at the end of the sense portion of a cycle when the bottom card of the stack contains a cut corner. It is noted that the lip 43 of the sensing member is engaging the cut corner edge 63 of the card 44. The arresting of the blade, and the resultant failure of the arm 45 to close the contacts 46 during this sensing portion of the cycle, signifies that the bottom card 44 of the stack contains a cut corner and the card is fed from the hopper by the picker later in the cycle without any delay.

However, when the bottom card of the stack in the hopper does not have a cut corner, the sensing mechanism signifies the absence of a cut corner in the card in the following manner. As before, the impulsing of the magnets 53 and 54 at index point 1 of the cycle releases the arm 45, the shaft 34, and sensing member 42 from their so called home positions shown in Figs. 1, 2 and 3. The arm, shaft and blade then rotate clockwise in Fig. 2 under the impetus of the spring 47. Due to the absence of a cut corner in the bottom card of the stack, there is nothing to block the clockwise movement of the sensing member and, as a result, the member, shaft, and arm are free to swing clockwise until the end of the arm 45 engages and closes the contacts 46. Fig. 2b shows the position the sensing member occupies in relation to the bottom card in the hopper at the end of the sense portion of the cycle when the bottom card does not contain a cut corner. The closing of the contacts 46 during the sense portion of the cycle, signifies that the bottom card in the hopper does not contain a cut corner by effecting the energization of the card delay mechanism through circuits to be later explained. As a result, the no cut corner card on the bottom of the stack in the hopper is moved clear of the operating path of the picker 21, and the feeding of the bottom card is delayed.

Each cycle after the bottom card of the stack in the hopper has been sensed for the presence or absence of a cut corner, the card sensing mechanism is restored to its so called home position in preparation for the next sensing operation. This is accomplished as follows: As the shaft 23 rocks clockwise from index point 5 to index point 7 to effect a card feed movement of the picker, a bail 71 secured to the shaft engages the arm 45 to rotate the arm, the shaft 34, and the sensing member 42 counter-clockwise in Fig. 2 until the arm 45 slides off the top of the armature 56 of the now deenergized magnets 53 and 54. The armature is, as a result, free to rotate clockwise in Fig. 3 around its pivot shaft 57 by the action of spring 58 to latch the arm 45, and associated shaft and sensing member in their home positions, as shown in Figs. 2 and 3. The shaft 23 then rocks counter-clockwise from index point 7 to index point 9 of each cycle to restore the picker to the position shown in Fig. 3 and to rock the bail 71 counter-clockwise to the positions shown so that the bail will not interfere with the movement of the arm 45 during the next sensing operation.

*Card feed delay mechanism*

The card feed delay mechanism 11 consists of a solenoid 73 secured to a bracket 74 attached to the side frame 17. A plunger 75 of the solenoid passes through an opening in the bracket 74 and extends horizontally beneath the rear end of base 41 of the hopper. The plunger is slidably supported by bearings 76 and 77 carried by brackets 78 and 79 secured to the bracket 74 and a bracket 80, respectively, the latter being secured to the base 41 of the hopper. Pivotally attached to the plunger 75 are four links 82, 83, 84, and 85, the upper ends of which are pivotally connected to pins 86, 87, 88, and 89 respectively, slidably mounted in suitable bearings carried by the bracket 80. It will be noted in Fig. 1, Fig. 2, and Fig. 3 that the pins extend upward through openings in the base of the card feed hopper at the trailing edge of the stack of cards. Consequently, as the plunger 75 moves to the right in Fig. 1 upon the energization of solenoid 73 in a manner to be later explained, the toggle action of the links 82, 83, 84 and 85 moves their related pins upward. As a result, the top ends of the pins lift the trailing edge of the stack of cards in the hopper above the operating path of the picker 21. Feeding of the bottom card 44 of the stack in the hopper is then delayed for as long as the solenoid 73 is held energized.

*Circuits*

The circuits shown in Fig. 4 control the sensing mechanism and card feed delay mechanism to provide either a 1 cycle delay or a 2 cycle delay, as desired, in the feeding of each master card as it reaches the bottom of the stack in the hopper. The circuits could be expanded in a similar vein, however, to obtain any desired number of cycles delay in the feeding of each master card. The functions of the various relays and contacts shown in the circuit diagram will be explained by reference to the operation of the mechanisms in effecting both a 1 cycle and a 2 cycle delay in the feeding of master cards.

Contacts 67, 91, 92, 93, 94 and 95 shown in Fig. 4, are closed during a definite time interval of each cycle by the previously mentioned cams secured to the continually rotating shaft 31 of the card handling machine. The interval in each cycle during which each of the contacts is closed is shown in Fig. 5, and the purpose of each contact will be later evident.

*1 cycle delay*

It will be assumed that detail or cut-corner cards have been fed from the hopper to the card handling machine. It will also be assumed that the following card, now at the bottom of the stack and in feeding position in the hopper, is a master card (a card without a cut corner) and that a 1 cycle delay in the feeding of the master card is desired. For ease of explanation the cycle during which the master card is prevented from feeding will be referred to as cycle #1, while the cycle during which the master card actually feeds will be referred to as cycle #2.

With the switch 66 in its "on" position in Fig. 4, the closing of cam contacts 67 at index point 1 of cycle #1 completes a circuit from the line 68 through the contacts 67, the switch 66, and the magnets 53 and 54 to the line 69, as previously explained. The resultant energization of the magnets 53 and 54 permits the arm 45 to engage and close the contacts 46 since the sensing member 42 fails to detect a cut corner card on the bottom of the stack in the hopper, in this instance. The contacts 46 remain closed from index point #1 of cycle #1 to index point #6 of the cycle, as shown in Fig. 5, at which time the bail 71 moves the arm 45 toward its home position as previously explained, and effects an opening of the contacts 46.

After the contacts 46 closed however, the closing of the cam contacts 91 at index point #2 of cycle #1 completed a circuit from the line 68 through the contacts 91, the relay contacts R98*a* (normally closed), the relay contacts R99*a* (normally closed), the contacts 46, now closed, and the pickup winding of a relay R100 to the line 69. The resultant energization of relay R100 closes its contacts R100*a*, R100*b* and R100*c*. With the contacts R100*a* closed, the closing of cam contacts 92 from index point 2 to index point 9 of cycle #1, holds the relay R100 energized through a circuit extending from the line 68 through the contacts 92, the contacts R100*a*, and the hold winding of relay R100 to the line 69.

The closing of the contacts R100*c* completes a circuit from the line 68 through a conductor 101, the contacts R100*c*, and the solenoid 73 to the line 69. The resultant energization of solenoid 73 from index point 2 to index point 9 of cycle #1 operates the pins 86, 87, 88, and 89 to lift the trailing edge of the card stack above the operating path of the picker 21. Consequently, as the picker moves to the right in Fig. 3 from index point 5 to index point 7 of cycle #1, the picker does not encounter, and, as a result, does not feed the master card at the bottom of the stack.

The solenoid 73 is deenergized at index point 9 of cycle #1 when the relay contacts R100*c* open as a result of the deenergization of relay R100 by the opening of cam contacts 92. As a result, the card stack drops to its normal position in the hopper and the master card at the bottom of the stack is again in feeding position. However, at index point #8 of cycle #1 before the relay R100 is deenergized and its related points open, the cam contacts 93 close and complete a circuit from the line 68 through the cam contacts 93, the relay contacts R100*b*, the pickup winding of relay R99 and then to the line 69. The resultant energization of relay R99 opens its contacts R99*a* and closes its contacts R99*b*, R99*c* and R99*d*. The relay R99 is held energized until index point 3.5 of cycle #2 through its own contacts R99*b* and the cam contacts 94 which are closed from index point #8 of cycle #1 to index point #3.5 of cycle #2.

With the relay R99 energized from index point 8 of cycle #1 to index point #3.5 of cycle #2, the master card at the bottom of the card stack is fed from the hopper during cycle #2, as desired. This is accomplished as follows: At index point #1 of cycle #2, the cam contacts 67 again close to energize the magnets 53 and 54. This releases the arm 45 which operates again to engage and close the contacts 46 since the sensing member 42 detects the master card in feeding position in the hopper. It will be remembered that with the contacts 46 closed in cycle #1, the closing of the cam contacts 91 completed a circuit to energize the relay R100. However, in cycle #2, even though the contacts 46 are again closed, the closing of the cam contacts 91 cannot complete a circuit to energize the relay R100 since the contacts R99*a* are open at this time as a result of relay R99 being energized. It will be noted in Fig. 5 that the cam contacts 94 hold the relay R99 energized until ½ of a cycle point after the cam contacts 91 again open.

With the relay R100 deenergized and its contacts R100*c* open, it is impossible for the solenoid 73 to be energized during cycle #2. As a result, the card stack remains in its normal position and the card feed movement of the picker 21 from index point 5 to index point 7 of cycle #2 feeds the master card at the bottom of the stack from the hopper. Therefore, the desired 1 cycle delay in the feeding of the master card has been obtained.

*2 cycle delay*

To obtain a two cycle delay in the feeding of each master card as it reaches the bottom of the stack in the hopper, it is necessary to transfer the switch 66 and the switch 102 to their "on" positions. It will be noted in Fig. 4 that with the switch 102 in its "on" position, a relay R103 is continually energized by a circuit extending from the line 68 through the switch 102 and the winding of the relay R103 to the line 69. The energizing of the relay R103 effects a closing of the contacts R103*a* and R103*b* to complete circuits which will be described later.

As before, it will be assumed that detail or cut corner cards have already been fed from the hopper to the card handling machine. It will also be assumed that the card on the bottom of the stack and in feeding position is a master card. To facilitate explanation, the first cycle during which the master card is prevented from feeding will be referred to as cycle #1, the second cycle during which the master card is again prevented from feeding will be referred to as cycle #2, and the next cycle during which the master card is actually fed from the hopper will be referred to as cycle #3.

During cycle #1 of the 2 cycle delay operation, the mechanism and circuits function in the same manner as previously explained in regard to the 1 cycle delay operation to prevent the feeding of the master card. Briefly reviewing this operation, the closing of the cam contacts 67 energizes the magnets 53 and 54 to unlatch the arm 45 which engages and closes the contacts 46 since the sensing member 42 detects the master card at the bottom of the card stack in the hopper. With the contacts 46 closed, the closing of the cam contact 91 completes a circuit to energize relay R100. The contacts R100*c* then close and energize the solenoid 73 to effect a delay in the feeding of the master card in cycle #1. It will be remembered that in the 1 cycle delay operation, the solenoid 73 was deenergized at cycle point 9 of cycle #1 and was prevented from being energized during cycle #2 due to the opening of the contacts R99*a* in the pickup circuit of relay R100. As a result, the master card was fed in cycle #2 after 1 cycle of delay. In the 2 cycle delay operation, the solenoid 73 is not deenergized at index point 9 of the first cycle, but is maintained in an energized condition until point 9 of cycle #2 so that an additional cycle of delay in the feeding of the master card is obtained. During cycle #3, the solenoid 73 is prevented from being energized by opening the contacts R98*a* in the pickup circuit of the relay R100. Relay R98 serves the same purpose in the 2 cycle delay operation as relay R99 does in the 1 cycle delay operation. As a result, the master card is fed during cycle #3 and the desired 2 cycles of delay in the feeding of the master card is obtained.

Solenoid 73 is maintained energized during cycle #2 as follows: The closing of cam contacts 93 at index point 8 of cycle #1 completes a circuit from the line 68 through the cam contacts 93, the relay contacts R100*b* which are closed at this time, and the pickup winding of relay R99 to the line 69. The contacts R99*c* then close to complete a circuit from the line 68 through the conductor 101, the relay contacts R99*c*, the relay contacts R103*b* (which are closed since relay R103 is continually energized when the switch 102 is closed), and the solenoid 73 to the line 69. Since the relay R99 is held energized through the cam contacts 94 until the index point 3.5 of cycle #2 as previously explained, the solenoid 73 is held energized through the contacts R99c from index point 9 of cycle #1, when it would normally have been deenergized as a result of the deenergization of relay 100 and the opening of the contacts R100c, until index point 3.5 of cycle #2 when relay R99 is deenergized. Since it is desired to maintain the solenoid 73 energized past index point 3.5 of cycle #2 when relay R99 is deenergized, an additional hold circuit for solenoid 73 is set up from index point 2 of cycle #2 until index point 9 of cycle #2. This circuit is completed as follows: At index point 2 of cycle #2, the cam contacts 95 close to complete circuit from the line 68 through the cam contacts 95, the relay contacts R103a, the relay contacts R99d, and the pickup winding of relay R105 to the line 69. The contacts R105a then close to complete a hold circuit for the relay from the line 68 through the cam contacts 92, the relay contacts R105a, and the hold coil of relay 105 to the line 69. Relay R105 is held energized until cycle point #9 of cycle #2 when the cam contact 92 opens. As a result, the solenoid 73 is maintained energized during this period by a circuit extending from the line 68 through the line 101, the relay contacts R105c, and the solenoid 73 to the line 69.

With the solenoid 73 energized until index point 9 of cycle #2, the pins 86, 87, 88 and 89 hold the card stack above the operating path of the picker until this time. Consequently, as the picker 21 moves to the right in Fig. 3 from index point 5 to index point 7 of cycle 2, it is unable to feed the bottom master card of the stack and the master card is delayed in feeding for a second cycle.

When the solenoid 73 is deenergized at index point 9 of cycle #2 as a result of the deenergization of the relay R105 and the resultant opening of the contacts R105c, the card stack drops to its normal position in the hopper and the bottom master card is again in feeding position. However, at index point #8 of cycle #2 before the relay R105 is deenergized and its contacts open, the cam contacts 93 close and complete a circuit from the line 68 through the relay contacts R105b and the pickup winding of relay R98 to the line 69. The resultant energization of relay R98, opens its contacts R98a and closes its contacts R98b. With the contacts R98b closed, a hold circuit for relay R98 is completed from the line 68 through the cam contacts 94 which are closed at this time, through the contacts R98b and the hold winding of relay R98 to the line 69. Relay R98 is held energized until the cam contacts 94 open at index point 3.5 of cycle #3.

As a result of relay R98 being energized from index point 8 of cycle #2 until index point #3.5 of cycle #3, the master card is fed during cycle #3 as desired. This is accomplished as follows: At index point #1 of cycle #3, the cam contacts 67 close to energize magnets 53 and 54. As a result, the arm 45 is again permitted to engage and close the contacts 46, since the blade 42 detects the master card on the bottom of the stack in the hopper. It will be remembered that with the contacts 46 closed in cycle #1, the closing of the cam contacts 91 completed a circuit to energize relay R100. The resultant closing of the relay contacts R100b energized solenoid 73 to effect a delay in the feeding of the master card during that cycle. However, in cycle #3, even though the contacts 46 are again closed, the closing of the cam contacts 91 cannot complete a circuit to energize relay R100 since the contacts R98a are open at this time as a result of relay R98 being energized. It will be noted in Fig. 5, that the cam contacts 94 hold relay R98 energized until ½ of a cycle point after the cam contacts 91 open.

With the relay R100 deenergized and its contacts R100c open it is impossible for the solenoid 73 to be energized during cycle #3. As a result, the card stack remains in its normal position and the card feed movement of the picker, from index point #5 to index point #7 of cycle #3, feeds the master card on the bottom of the stack from the hopper. Therefore, the desired result of 2 cycles of delay in the feeding of the master card has been obtained.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. Mechanism for controlling the feeding of cards from a hopper by a picker in response to the sensing of card designations, comprising, in combination, means for sensing each card in feeding position in the hopper for designations, and means operating in response to the sensing of designations in said card for controlling the effectiveness of said picker to feed said card.

2. Mechanism for controlling the feeding of cards from a hopper by a picker in response to the sensing of a card designation comprising, in combination, means for sensing each card in feeding position in the hopper for a predetermined designation, and means controlled by said sensing means and operative when the latter fails to sense said predetermined designation to prevent the feeding of said card by said picker for a predetermined time interval.

3. Mechanism for controlling the feeding of cards from a hopper by a picker in response to the sensing of card designations comprising, in combination, means for sensing each card in feeding position in the hopper for the presence or absence of a cut corner, and means controlled by said sensing means and operative when the latter fails to sense a cut corner to prevent the feeding of said card by said picker for a predetermined time interval.

4. Mechanism for feeding cards from a card stack in a hopper in response to the sensing of designations on the cards comprising, in combination, means operative to feed the cards successively from the bottom of the stack and from the hopper, means for sensing each card as it reaches the bottom of stack for a predetermined designation, and means controlled by said sensing means and operative when the latter fails to sense the predetermined designation for delaying the feeding of cards from the hopper by said feed mechanism.

5. Mechanism for controlling the feeding of the bottom card of a card stack from a hopper by a picker in response to the sensing of card designations comprising, in combination, means for sensing the bottom card of the stack for the presence or absence of a cut corner, and means controlled by said sensing means and operative when the latter fails to sense a cut corner to move said card out of the path of said picker for a predetermined time interval thereby delaying the feeding of said card.

6. Mechanism for controlling the feeding of the bottom card of a card stack from a hopper by a picker in response to the sensing of card designations comprising, in combination, electrical means operative when energized to move the bottom card of the stack out of the path of the picker and thereby prevent card feed, circuit means including a normally open contact for energizing said electrical means, means for sensing the bottom card of the stack for the presence or absence of a cut corner prior to card feed movement of the picker, and means controlled by said sensing means and operative when the latter fails to sense a cut corner in said card for closing said contact.

7. Mechanism for controlling the feeding of the bottom card of a card stack from a hopper by a picker in response to the sensing of card designations comprising, in combination, electrical means operative when energized to raise the trailing edge of the bottom card in the stack above the operating path of the picker thereby preventing card feed, circuit means including a normally open contact for controlling the energizing of said electrical means, means for sensing the bottom card of the stack for the presence or absence of a cut corner prior to card feed movement of said picker, an arm controlled by said sensing means and operative when the latter fails to sense a cut corner for closing said contact, and circuit means to make ineffective the closing of said contact by said arm after the expiration of a predetermined time interval.

8. Mechanism for controlling the feeding of the bottom card of a card stack from a hopper by a cyclically operated picker in response to the sensing of card designations comprising, in combination, a plurality of pins slidably extending through the base of the hopper near the trailing edge of the card stack and adapted for vertical movement, means including a solenoid operative to raise said pins in the hopper thereby lifting the trailing edge of the bottom card of the stack above the path of the picker to prevent card feed, circuit means including a normally open contact for energizing said solenoid for a predetermined time interval, cyclically operated means for sensing the bottom card of the stack for the presence or absence of a cut corner prior to card feed movement of the picker, an arm controlled by said sensing means and operative when the latter fails to sense a cut corner for closing said contact, and circuit means to make ineffective the closing of said contact by said arm after the expiration of said predetermined interval.

9. Mechanism for feeding cards from a card stack in a hopper in response to the sensing of card designations, comprising, in combination, a cyclically operative picker for successively feeding the bottom card of the stack from the hopper, a solenoid, a plurality of pins operable upon the energization of said solenoid for raising the trailing edge of the bottom card above the operating path of said picker to prevent card feed, circuit means including a normally open contact for energizing said solenoid for a predetermined time interval, means including a blade to sense each card as it reaches the bottom of the stack for the presence or absence of a cut corner and an arm controlled by said sensing means and operative when the latter fails to sense a cut corner for closing said contact.

RICHARD ALAN STEWART.
ARNOLD E. BARBER.

REFERENCES CITED

The following references are of record in the file of this patent:

UNITED STATES PATENTS

| Number | Name | Date |
|---|---|---|
| 1,991,729 | Brougham | Feb. 19, 1935 |
| 2,476,449 | McDonnell | July 19, 1949 |
| 2,531,385 | Mills et al. | Nov. 28, 1950 |